(12) United States Patent
Hazan et al.

(10) Patent No.: US 11,095,435 B2
(45) Date of Patent: Aug. 17, 2021

(54) KEYSTROKE DYNAMICS ANONIMIZATION

(71) Applicant: International Business Machines Corporation, Armonk, NY (US)

(72) Inventors: Itay Hazan, Beer Sheva (IL); Eitan Menahem, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 16/554,790

(22) Filed: Aug. 29, 2019

(65) Prior Publication Data

US 2021/0067322 A1    Mar. 4, 2021

(51) Int. Cl.
    *G06F 21/00* (2013.01)
    *H04L 9/06* (2006.01)
    *H04L 9/08* (2006.01)

(52) U.S. Cl.
    CPC .......... *H04L 9/0662* (2013.01); *H04L 9/0643* (2013.01); *H04L 9/0863* (2013.01)

(58) Field of Classification Search
None
See application file for complete search history.

(56) References Cited

U.S. PATENT DOCUMENTS

| | | | |
|---|---|---|---|
| 8,151,364 B2 * | 4/2012 | Hewitt | H04L 9/3271 726/30 |
| 8,332,932 B2 | 12/2012 | Kellas-Dicks et al. | |
| 8,712,050 B2 | 4/2014 | Delia et al. | |
| 9,768,959 B2 | 9/2017 | Yi et al. | |
| 9,798,463 B2 | 10/2017 | Luo et al. | |
| 2004/0059950 A1 | 3/2004 | Bender et al. | |
| 2006/0242424 A1 | 10/2006 | Kitchens et al. | |
| 2006/0271790 A1 * | 11/2006 | Chen | G06F 21/32 713/185 |

(Continued)

FOREIGN PATENT DOCUMENTS

| | | |
|---|---|---|
| EP | 2477136 | 7/2012 |
| GB | 2470579 | 12/2010 |
| WO | 2013006071 | 1/2013 |

OTHER PUBLICATIONS

Lin, Tu-Liang; Chen, Yu-Sheng. A Chinese Continuous Keystroke Authentication Method Using Cognitive Factors. 2019 IEEE International Conference on Consumer Electronics—Taiwan (ICCE-TW). https://ieeexplore.IEEE.org/stamp/stamp.jsp?tp=&arnumber=8991902 (Year: 2019).*

(Continued)

*Primary Examiner* — Jeremiah L Avery
(74) *Attorney, Agent, or Firm* — Dvir Gassner

(57) ABSTRACT

A keystroke dynamics anonymization technique that includes: receiving a plain-text password from a computer user; providing at least the plain-text password as a seed to a pseudorandom mapping function; applying the pseudorandom mapping function to keycodes that are produced by the computer responsive to keystrokes of the computer user, to map the keycodes to a set of mapped, anonymized keycodes; and providing the set of mapped, anonymized keycodes to a keystroke dynamics algorithm, to enable the keystroke dynamics algorithm to (a) learn a keystroke dynamics model of the computer user, and (b) authenticate an identity of the computer user.

20 Claims, 3 Drawing Sheets

(56) References Cited

U.S. PATENT DOCUMENTS

| | | | |
|---|---|---|---|
| 2008/0184363 A1* | 7/2008 | Narasimhan | G06F 21/36 |
| | | | 726/18 |
| 2009/0150992 A1 | 6/2009 | Kellas-Dicks et al. | |
| 2011/0302397 A1* | 12/2011 | Mitola, III | G06F 9/524 |
| | | | 712/241 |
| 2014/0351914 A1 | 11/2014 | Suresh et al. | |
| 2019/0080061 A1 | 3/2019 | Baek | |

OTHER PUBLICATIONS

Popovici, Eduard C. et al. Combined use of pattern recognition algorithms for keystroke-based continuous authentication system. 2014 10th International Conference on Communications (COMM), https://ieeexplore.IEEE.org/stamp/stamp.jsp?tp=&arnumber=6866686 (Year: 2014).*

Darabseh, Alaa; Namin, Akbar Siami. On Accuracy of Classification-Based Keystroke Dynamics for Continuous User Authentication. 2015 International Conference on Cyberworlds (CW). https://ieeexplore.IEEE.org/stamp/stamp.jsp?tp=&arnumber=7398434 (Year: 2015).*

Anusas-amornkul, Tanapat; Wangsuk, Kasem. A comparison of keystroke dynamics techniques for user authentication. 2015 International Computer Science and Engineering Conference (ICSEC). https://ieeexplore.IEEE.org/stamp/stamp.jsp?tp=&arnumber=7401401 (Year: 2015).*

* cited by examiner ically and illustrative and not
KEYSTROKE DYNAMICS ANONIMIZATION

BACKGROUND

The invention relates to the field of keystroke dynamics.

Keystroke dynamics is one of the most researched topics in the behavioral biometrics domain. Keystroke dynamics identifies and measures the manner and rhythm in which a person types on a keyboard—whether a physical or a virtual one. For example, a keystroke dynamics system can tell how quickly the person tends to type, whether the person types all characters at the same pace or pauses before typing specific characters, how long the person tends to hold each key, etc.

Research has shown that keystroke dynamics of individuals are quite unique, enabling a security system to reliably authenticate the identity of a person based his or her measured keystroke dynamics. Therefore, some security systems use keystroke dynamics as either an add-on to traditional authentication techniques (such as passwords, tokens, two-factor authentication, etc.), or as a complete replacement of such techniques.

Authentication by keystroke dynamics typically involves a machine learning algorithm that uses several logged keystroke sessions to train a model that is characteristic of the pertinent user. Then, a new keystroke session of the user (or someone professing to be the user) can be compared, by the machine learning algorithm, to the model. When the contents of this new keystroke session sufficiently fit the model—the identity of the user is authenticated.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method that comprises operating at least one hardware processor to: receive a plain-text password from a computer user; provide at least the plain-text password as a seed to a pseudorandom mapping function; apply the pseudorandom mapping function to keycodes that are produced by the computer responsive to keystrokes of the computer user, to map the keycodes to a set of mapped keycodes; and provide the set of mapped keycodes to a keystroke dynamics algorithm, to enable the keystroke dynamics algorithm to (a) learn a keystroke dynamics model of the computer user, and (b) authenticate an identity of the computer user.

Another embodiment relates to a system that comprises: (a) at least one hardware processor; and (b) a non-transitory computer-readable storage medium having program code embodied therewith, the program code executable by said at least one hardware processor to: receive a plain-text password from a computer user; provide at least the plain-text password as a seed to a pseudorandom mapping function; apply the pseudorandom mapping function to keycodes that are produced by the computer responsive to keystrokes of the computer user, to map the keycodes to a set of mapped keycodes; and provide the set of mapped keycodes to a keystroke dynamics algorithm, to enable the keystroke dynamics algorithm to (i) learn a keystroke dynamics model of the computer user, and (ii) authenticate an identity of the computer user.

A further embodiment relates to a computer program product that comprises a non-transitory computer-readable storage medium having program code embodied therewith, the program code executable by at least one hardware processor to: receive a plain-text password from a computer user; provide at least the plain-text password as a seed to a pseudorandom mapping function; apply the pseudorandom mapping function to keycodes that are produced by the computer responsive to keystrokes of the computer user, to map the keycodes to a set of mapped keycodes; and provide the set of mapped keycodes to a keystroke dynamics algorithm, to enable the keystroke dynamics algorithm to (a) learn a keystroke dynamics model of the computer user, and (b) authenticate an identity of the computer user.

In some embodiments, some of the keycodes that are produced by the computer form sensitive information that is at least one of: a password, personally-identifiable information, and a user name.

In some embodiments, the method further comprises, or the program instructions are further executable to: after the keycodes are mapped, preventing the keycodes from being stored in the computer.

In some embodiments, the method further comprises, or the program instructions are further executable to: after at least the plain-text password is provided as the seed to the pseudorandom mapping function, preventing the plain-text password from being stored in the computer.

In some embodiments, the pseudorandom mapping function is a shuffling function that shuffles the keycodes to produce the set of mapped keycodes, such that the keystroke dynamics algorithm processes the mapped keycodes as if they were the keycodes.

In some embodiments, the pseudorandom mapping function is a hash function, such that the mapped keycodes are hash codes.

In some embodiments, a unique user identifier is provided, in addition to the plain-text password, as the seed.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a method, system, and computer program product for anonymizing logged keystrokes that are used for keystroke dynamics-based user authentication.

In typical keystroke dynamics systems, user keystrokes are logged, usually with timestamps indicating when each key was pressed and optionally also when it was released. Then, these logs are processed by a machine learning algorithm for learning a keystroke dynamics model that characterizes the user, and later for authenticating the identity of the user by comparing newly-logged keystrokes against the model.

If an attacker gains access to these logs, whether they are stored in the user's computer or in a server, he or she may easily extract sensitive information of the user—such as user names and passwords typed by the user, or personally-identifiable information (e.g., name, residential address, email address, social security number, financial information, medical information, etc.) that the user entered.

Accordingly, embodiments of the present invention aim to anonymize the keystrokes of the user before they are being provided to a keystroke dynamics algorithm for learning and/or authentication. Some embodiments also prevent the keystrokes from being stored in the user's computer and/or in any server involved in the keystroke dynamics process, thereby enhancing security.

Embodiments of the present invention may ensure that keystrokes by the same user over different typing sessions are each consistently transformed to the same anonymized form. For example, a certain keystroke X will always be anonymized to the same form Y across different sessions. This ensures that the keystroke dynamics model of the user always maintains its correctness, and does not have to be recreated in every typing session.

Although the anonymized keystrokes are consistent per user, they are designed to be different for different users, to ensure security. Namely, the anonymized keystrokes of one user who typed a certain string of characters will be different than the anonymized keystrokes of a different user who typed that same string of characters.

Figure 1:
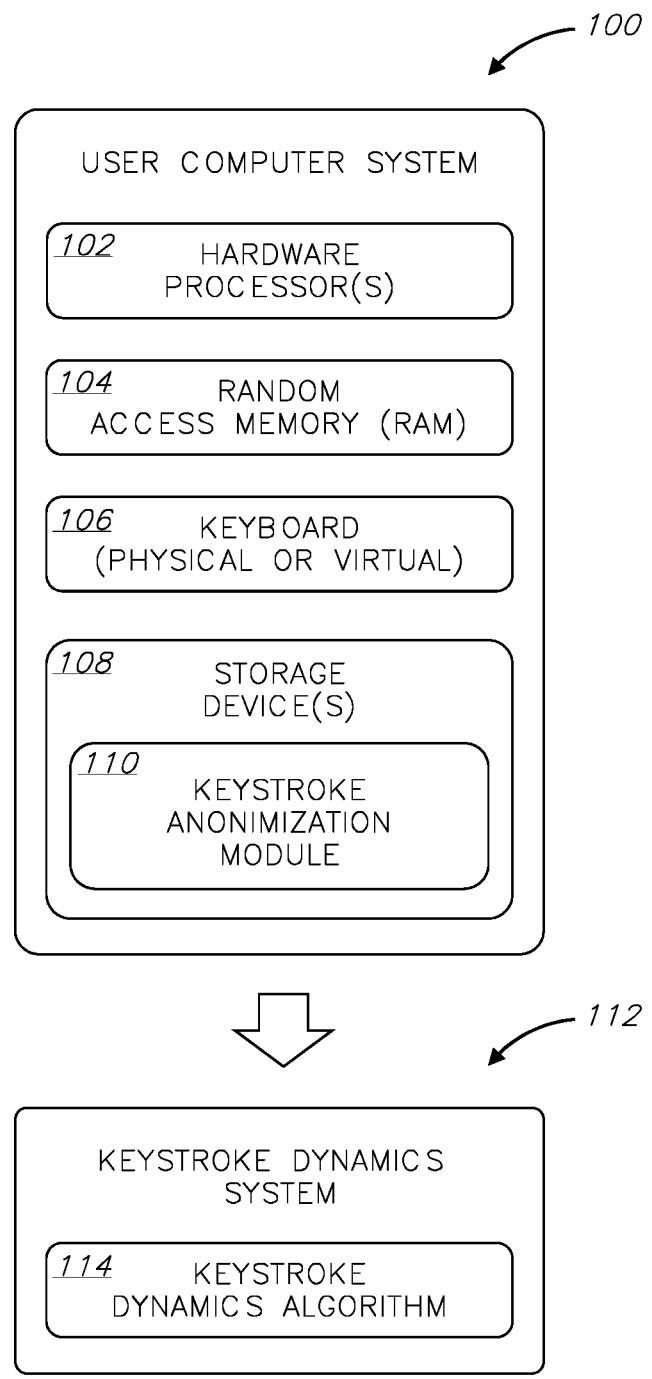
FIG. 1 is a block diagram of an exemplary configuration for keystroke anonymization, according to an embodiment.

Reference is now made to FIG. 1, which shows a block diagram of an exemplary configuration for automated keystroke anonymization, according to an embodiment. This configuration may include a user computer system 100 that is associated with a keystroke dynamics system 112.

User computer system 100 may be a desktop computer, a laptop computer, a tablet computer, a smartphone, or any other type of a computer which allows a user to type information using a keyboard—physical or virtual.

User computer system 100 may include a processing unit (also "hardware processor," "CPU," or simply "processor"), such as one or more hardware processor(s) 102; a random-access memory (RAM) 104; a keyboard 106; and one or more non-transitory computer-readable storage device(s) 108. A keystroke anonymization module 110 may be a software program stored on storage device(s) 108.

User computer system 100 as described herein is only an exemplary embodiment of the present invention, and in practice, features of it may be implemented in hardware only, software only, or a combination of hardware and software. User computer system 100 may have more or fewer components and modules than shown, may combine two or more of the components, or may have a different configuration or arrangement of the components. User computer system 100 may include any additional component enabling it to function as an operable computer system, such as a motherboard, data busses, power supply, and the like (not shown).

Storage device(s) 108 may have stored thereon software instructions, such as those of keystroke anonymization module 110, for processing by hardware processor(s) 102. In some embodiments, the software instructions may include an operating system, having various software components and/or drivers for controlling and managing general system tasks (e.g., memory management, storage device control, power management, etc.), and facilitating communication between various hardware and software components.

Keyboard 106 may be a physical keyboard or a virtual one. A physical keyboard includes physical keys (also "buttons") that act as electrical switches or otherwise trigger an electrical response. A virtual keyboard is a graphical user interface (GUI) element that is displayed on a touch screen when needed; typing is performed by touching the touch screen (with a finger or a suitable object such as a stylus) over the location of any desired virtual key. Another variant of a virtual keyboard is a projected keyboard (e.g., a laser-projected keyboard) that allows the user to "press" keys by touching the surface on which the keyboard is projected, or by performing manual gestures in the air, proximate to the projection surface.

Keyboard 106 may include at least some of the following: alphanumeric (or "character") keys for typing, modifier keys for altering the functions of other keys, navigation keys for moving the text cursor on the screen, function keys, system command keys, and often a numeric keypad to facilitate calculations. Keyboard 106 may have any suitable layout of keys, such as a QWERTY-based Latin-script layout, a non-QWERTY-based Latin-script layout, a non-Latin layout, a numerical-only only (i.e., a digits keypad), or the like.

The configuration shown in FIG. 1 also includes a keystroke dynamics system 112, which comprises a keystroke dynamics algorithm 114. Keystroke dynamics system 112 may be a computer separate from user computer system 100, and communication between the two may be conducted over a computer network, such as a local area network (LAN) or a wide area network (WAN) such as the Internet. Keystroke dynamics system 112 may therefore include similar components to user computer system 100, such as a processing unit, RAM, and storage device(s)—which are not shown in the figure for reasons of simplicity. Alternatively, keystroke dynamics system 112 may be integrated with user computer system 100, on the same computer. As a further alternative, some functionalities of keystroke dynamics system 112 may be integrated with user computer system 100, and some may reside on a separate computer system.

In operation, user computer system 100 may log keystrokes made by a user using keyboard 106, anonymize the keystrokes using keystroke anonymization module 110, and provide the anonymized keystrokes to keystroke dynamics algorithm 114. Keystroke dynamics algorithm 114 may use the anonymized keystrokes for learning a keystroke dynamics model that characterizes the user, and for authenticating the identity of the user by comparing newly-logged keystrokes to the model.

Figure 2:
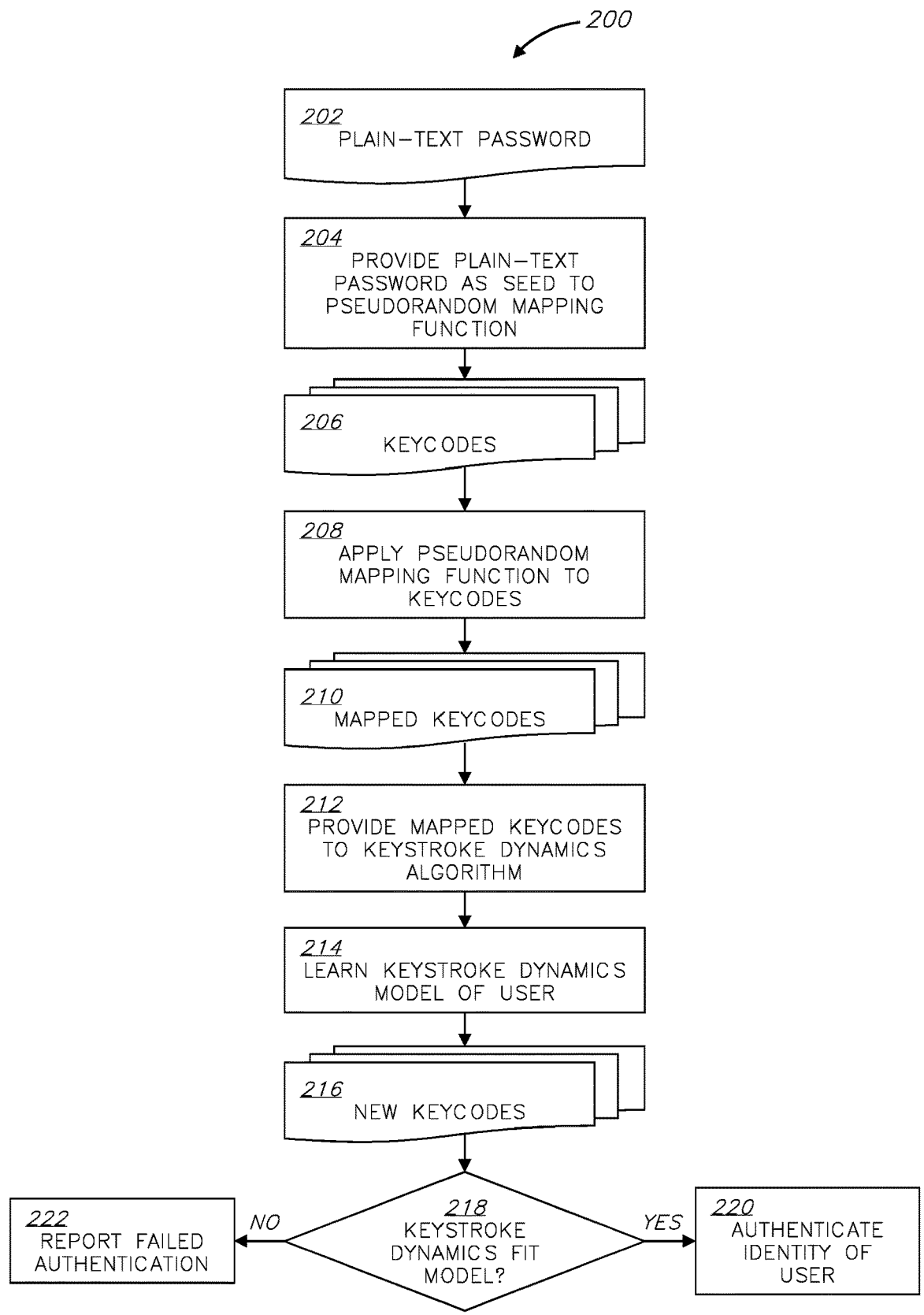
FIG. 2 is a flow chart of an exemplary method for keystroke anonymization, according to an embodiment.

An overview of the functional steps in a method 200 for automated keystroke anonymization is provided with reference to the flowchart of FIG. 2. The method illustrated in FIG. 2 may be performed by the program instructions of keystroke anonymization module 110 and keystroke dynamics algorithm 114 of FIG. 1.

Initially, a plain-text password 202 may be received from a user, such as by typing the password into the user's computer or uttering the password to a speech recognition functionality of the user's computer. Plain-text password 202 may be of any suitable length and complexity, which factors are optionally prescribed by a policy dictated to the user when she first creates the password. For example, the policy may require a password longer than a certain amount of characters, which includes a certain minimal number of small letters, capital letters, numbers, and/or special characters (such as punctuation marks and non-letter symbols). As usually with passwords, the longer and more complex the password is—the better protection it provides against guessing attempts and brute-force attacks.

In a step 204, plain-text password 202 may be provided as a seed to a pseudorandom mapping function. The pseudorandom mapping function may be a deterministic function which maps input to output such that an output sequence approximates a random order or a random distribution of an input sequence. The output sequence is not truly random, because it is completely determined by an initial value—the seed. Therefore, if the user provides the same plain-text password 202 at the beginning of each typing session (e.g., every time she logs into one of her computers), the same mapping of input to output will occur. In addition, as long as each user of the present invention uses their own unique plain-text password, the mapping function and the output sequences of the various users will be different, ensuring that if a plain-text password or even a mapping function of one user was discovered by an attacker—the attacker will not be able to reverse-map output sequences of other users. In case the pseudorandom mapping function requires only a numerical value as its seed, then plain-text password 202 may be converted to such numerical value using any arbitrary conversion function. Optionally, to avoid identical mappings of multiple users who happen to have selected the same plain-text password, the seed can be made unique by adding another character string to it. For example, each user's user name (or any unique identifier of each user, such as an email address, telephone number, etc.) may be concatenated with their plain-text password, and the result be used as the seed. As the user name is unique, the seed will also be unique for each user. As an alternative to concatenation, any form of combining the unique user identifier and the plain-text password (such as, for example, hashing them together) may be used.

Figure 3:
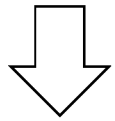
FIG. 3 is a diagram illustrating keycodes that are mapped by an exemplary shuffling function, according to an embodiment.

Optionally, the pseudorandom mapping function is a shuffling function that, given a known input domain (i.e., all possible keycodes from a keyboard's operation), shuffles the contents (the keycodes) of this domain. An example is illustrated in FIG. 3, which shows a table of standard Unicode keycodes 300 that are the input domain, and a table of shuffled keycodes 302. The exemplary shuffling function maps the keycode "20" to "187," "73" to "86," "66" to "88," and "77" to "83." Accordingly, when this exemplary shuffling function is applied to the keycode sequence {20,73,66,77}, which is the result of typing "IBM" (with Caps Lock on) on a Unicode-compliant keyboard, the output will be {187,86,88,77}, which corresponds to "VXM"—not something which resembles "IBM." Thus, the name "IBM" was anonymized.

A shuffling function is advantageous if one desires to use a standard keystroke dynamics algorithm—one which is configured to process standard, raw keycode, such as Unicode keycodes which are now widely accepted. The shuffling function will provide the keystroke dynamics algorithm with the same type of input it expects—such as 1-3-digit keycodes. The keystroke dynamics algorithm will process this input without knowing these are not the real keycodes produced by the user's keystrokes, but rather a derivation of them. Nevertheless, the keystroke dynamics algorithm will process the anonymized keycodes just as if they were the original keycodes, and will create a working keystroke dynamics model of the user, and later authenticate the user's identity, without this anonymized input having any adverse effect.

As an alternative to a shuffling function, the pseudorandom mapping function may be any function which maps keycodes to other values, such as sequences of alphanumeric characters, special symbols, and/or the like. One example is a hash function that maps the keycodes to hash codes of equal lengths, as known in the art. Hashing the keycodes may typically result in a longer representation of each keycode, but this may be desired in some situations.

Reference is made back to FIG. 2. Optionally, after the plain-text password has been provided 204 as the seed to the pseudorandom mapping function, the plain-text password may be actively deleted from the computer (from its RAM and/or non-volatile storage) or at least prevented from being stored in the computer. This may enhance security, by not exposing the plain-text password unnecessarily. This optional step is not shown in FIG. 2 for reasons of brevity.

Next, as the user starts interacting with her computer, she presses various keys on the computer's keyboard. Responsive to these keystrokes, the computer generates corresponding keycodes 206, which are short numeric codes (e.g., 1-3 digits-long) each representing a different key, as known in the art. Timing of the keystrokes is recorded as well, for example as a time stamp of when a key was pressed and optionally another time stamp of when the key was released. The combination of the keycodes and the timing information, as known in the art, is what enables the later creation of a keystroke dynamics model of the user, and the authentication of the user's identity based on the model.

Keycodes 206 may occasionally include sequences that form sensitive information typed by the user, such as one or more passwords, user names, personally-identifiable information, etc. Thus, it is desirable to anonymize these keycodes 206 so that the sensitive information cannot be easily discovered by a third party.

In a step 208, the pseudorandom mapping function may be applied to keycodes 206, to map the keycodes to a set of mapped keycodes 210. Optionally, this mapping is performed in real-time, immediately after each keycode is generated by a keystroke. This enables actively deleting each keycode from the user's computer (its RAM and/or non-volatile storage) as soon as it is mapped, or at least preventing storage of the keycode on the computer, to prevent the keycode's non-secure storage and lower the risk of it being discovered by an attacker. As an alternative, batch processing of keycodes may be performed, so that they are mapped in small groups (e.g., groups of 3-20 keycodes). This exposes the keycodes for a longer duration than the real-time option (they are deleted only after the entire groups has finished to map), but has the advantage of not causing any lags to the user's computer as a result of constant calculation of mappings.

In a step 212, mapped keycodes 210 may be provided (along with their associated timestamps) to a keystroke dynamics algorithm. This may be a standard algorithm which is known in the art.

In a step 214, the keystroke dynamics algorithm employs machine learning techniques to learn (also referred to as "train") a keystroke dynamics model of the computer user, as known in the art, provided there is a sufficient amount of mapped keycodes 210.

Next, the keystroke dynamics algorithm may receive new keycodes resulting from some user typing on a computer; at this point it is not yet known whether that user is the original one for which the keystroke dynamics model was created, or another user attempting to impersonate the original user or simply using the original user's computer. It is therefore desired to authenticate the identity of the original user.

Accordingly, in a decision step 218, the new keycodes, along with their timestamps, may be processed by the keystroke dynamics algorithm, to check their degree of fitness to the keystroke dynamics model of the original user. If the new keycodes sufficiently fit the model (i.e., above a predefined threshold or confidence score), then the original user's identity is authenticated in a step 220, and various actions may take place responsive to this authentication: for example, enabling the user to log in to a secure server or to obtain sensitive data. If, however, the new keycodes do not sufficiently fit the model, then the keystroke dynamics algorithm may report the failed authentication in a step 222, and consequently cause revocation of the user's access to a secure server, to sensitive data, etc.

Although FIGS. 1 and 2 refer to a single computer system of the user, present embodiments may equally function in the common scenario of a user who alternately uses multiple computer systems. Each of these computer systems may have a keystroke anonymization module installed or otherwise accessible, and, as long as the user uses the same plain-text password to initialize the anonymization process on all the computers she uses—the anonymization will be consistent. Thus, anonymized keycodes from all computers and all typing sessions of that user may be sent to a server (e.g., over the Internet), where a single keystroke dynamics model of the user is maintained and used to authenticate her identity.

An attacker wishing to reverse the mapping in order to discover what the user was typing, especially the typed sensitive data, can either try to guess the seed (the plain-text password), or to crack the mapping. Assuming that the plain-text password chosen by the user is relatively complex, guessing it is impractical. As to cracking the mapping using a brute-force attack, this will require traversing an enormous number of possibilities, given the possible combinations of the seed and the resultant mappings. With today's computing power, such an attack can take numerous years to succeed. Accordingly, the keystroke anonymization technique disclosed herein is extremely secure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising operating at least one hardware processor to:
   receive a plain-text password from a computer user;
   provide at least the plain-text password as a seed to a pseudorandom mapping function;
   apply the pseudorandom mapping function to keycodes that are produced by the computer responsive to keystrokes of the computer user, to map the keycodes to a set of mapped keycodes; and
   provide the set of mapped keycodes to a keystroke dynamics algorithm, to enable the keystroke dynamics algorithm to (a) learn a keystroke dynamics model of the computer user, and (b) authenticate an identity of the computer user.

2. The method according to claim 1, wherein some of the keycodes that are produced by the computer form sensitive information that is at least one of: a password, personally-identifiable information, and a user name.

3. The method according to claim 1, further comprising, after the keycodes are mapped, preventing the keycodes from being stored in the computer.

4. The method according to claim 1, further comprising, after at least the plain-text password is provided as the seed to the pseudorandom mapping function, preventing the plain-text password from being stored in the computer.

5. The method according to claim 1, wherein the pseudorandom mapping function is a shuffling function that shuffles the keycodes to produce the set of mapped keycodes, such that the keystroke dynamics algorithm processes the mapped keycodes as if they were the keycodes.

6. The method according to claim 1, wherein the pseudorandom mapping function is a hash function, such that the mapped keycodes are hash codes.

7. The method according to claim 1, wherein a unique user identifier is provided, in addition to the plain-text password, as the seed.

8. A system comprising:
   (a) at least one hardware processor; and
   (b) a non-transitory computer-readable storage medium having program code embodied therewith, the program code executable by said at least one hardware processor to:
   receive a plain-text password from a computer user,
   provide at least the plain-text password as a seed to a pseudorandom mapping function,
   apply the pseudorandom mapping function to keycodes that are produced by the computer responsive to keystrokes of the computer user, to map the keycodes to a set of mapped keycodes, and
   provide the set of mapped keycodes to a keystroke dynamics algorithm, to enable the keystroke dynamics algorithm to (i) learn a keystroke dynamics model of the computer user, and (ii) authenticate an identity of the computer user.

9. The system according to claim 8, wherein some of the keycodes that are produced by the computer form sensitive information that is at least one of: a password, personally-identifiable information, and a user name.

10. The system according to claim 8, wherein the program code is further executable by said at least one hardware processor to:
    after the keycodes are mapped, prevent the keycodes from being stored in the computer.

11. The system according to claim 8, wherein the program code is further executable by said at least one hardware processor to:
    after at least the plain-text password is provided as the seed to the pseudorandom mapping function, preventing the plain-text password from being stored in the computer.

12. The system according to claim 8, wherein the pseudorandom mapping function is a shuffling function that shuffles the keycodes to produce the set of mapped keycodes, such that the keystroke dynamics algorithm processes the mapped keycodes as if they were the keycodes.

13. The system according to claim 8, wherein the pseudorandom mapping function is a hash function, such that the mapped keycodes are hash codes.

14. The system according to claim 8, wherein a unique user identifier is provided, in addition to the plain-text password, as the seed.

15. A computer program product comprising a non-transitory computer-readable storage medium having program code embodied therewith, the program code executable by at least one hardware processor to:
   receive a plain-text password from a computer user;
   provide at least the plain-text password as a seed to a pseudorandom mapping function;
   apply the pseudorandom mapping function to keycodes that are produced by the computer responsive to keystrokes of the computer user, to map the keycodes to a set of mapped keycodes; and
   provide the set of mapped keycodes to a keystroke dynamics algorithm, to enable the keystroke dynamics algorithm to (i) learn a keystroke dynamics model of the computer user, and (ii) authenticate an identity of the computer user.

16. The computer program product according to claim 15, wherein some of the keycodes that are produced by the computer form sensitive information that is at least one of: a password, personally-identifiable information, and a user name.

17. The computer program product according to claim 15, wherein the program code is further executable by the at least one hardware processor to:
   after the keycodes are mapped, prevent the keycodes from being stored in the computer.

18. The computer program product according to claim 15, wherein the program code is further executable by the at least one hardware processor to:
   after at least the plain-text password is provided as the seed to the pseudorandom mapping function, preventing the plain-text password from being stored in the computer.

19. The computer program product according to claim 15, wherein the pseudorandom mapping function is a shuffling function that shuffles the keycodes to produce the set of mapped keycodes, such that the keystroke dynamics algorithm processes the mapped keycodes as if they were the keycodes.

20. The computer program product according to claim 15, wherein a unique user identifier is provided, in addition to the plain-text password, as the seed.

* * * * *